(12) United States Patent
Omi

(10) Patent No.: US 7,682,111 B2
(45) Date of Patent: Mar. 23, 2010

(54) BORE CUTTER

(75) Inventor: Shohei Omi, Anjo (JP)

(73) Assignee: OMI Kogyo Co., Ltd, Anjo-Shi (JP)

( * ) Notice: Subject to any disclaimer, the term of this patent is extended or adjusted under 35 U.S.C. 154(b) by 952 days.

(21) Appl. No.: 11/424,119

(22) Filed: Jun. 14, 2006

(65) Prior Publication Data
US 2007/0212178 A1 Sep. 13, 2007

(30) Foreign Application Priority Data
Mar. 7, 2006 (JP) .............................. 2006-061107

(51) Int. Cl.
*B23B 51/02* (2006.01)
(52) U.S. Cl. .................... 408/224; 408/227; 407/53; 407/61
(58) Field of Classification Search ................ 408/223, 408/224, 227; 407/53, 54, 61–63; *B23B 51/02*
See application file for complete search history.

(56) References Cited

U.S. PATENT DOCUMENTS

| | | | | | |
|---|---|---|---|---|---|
| 93,824 | A | * | 8/1869 | Humphreys | 408/219 |
| 279,360 | A | * | 6/1883 | Douglas | 408/223 |
| 595,346 | A | * | 12/1897 | Saacke | 408/229 |
| 624,156 | A | * | 5/1899 | Balcom | 408/222 |
| 683,696 | A | * | 10/1901 | Maillard | 433/144 |
| 832,076 | A | * | 10/1906 | Oster | 408/218 |
| 931,526 | A | * | 8/1909 | Turner et al. | 408/219 |
| 1,328,430 | A | * | 1/1920 | Hathaway | 144/240 |
| 1,408,793 | A | * | 3/1922 | Anderson, Jr. et al. | 408/222 |
| 1,465,058 | A | * | 8/1923 | Rock | 144/218 |
| 1,475,561 | A | * | 11/1923 | Bath et al. | 408/222 |
| 1,539,628 | A | * | 5/1925 | Bayer | 408/219 |
| 1,817,133 | A | * | 8/1931 | Duchesne | 408/218 |
| 1,826,323 | A | * | 10/1931 | Mueller | 408/219 |
| 2,358,608 | A | * | 9/1944 | Turner | 408/153 |
| 2,735,116 | A | * | 2/1956 | Mueller | 408/218 |
| 2,898,612 | A | * | 8/1959 | Hofbaner | 408/216 |
| 3,346,894 | A | * | 10/1967 | Lemelson | 408/12 |
| 4,507,028 | A | * | 3/1985 | Matsushita | 408/230 |
| 4,655,648 | A | * | 4/1987 | Hellbergh | 407/42 |
| 5,282,705 | A | * | 2/1994 | Shiga et al. | 408/211 |
| 5,570,978 | A | * | 11/1996 | Rees et al. | 408/144 |

(Continued)

FOREIGN PATENT DOCUMENTS

CN    1212192    3/1999

(Continued)

*Primary Examiner*—Eric A Gates
(74) *Attorney, Agent, or Firm*—Workman Nydegger

(57) ABSTRACT

First and second bore blade portions are provided on the outer periphery of a rotary shaft at intervals in the circumferential direction with a rotation axis as the center. A first bore blade portion has a continuous blade and a second bore blade portion has a discontinuous blade having protruding blade edges and indented blade edges, which are alternately provided. The distance in the radial direction of the protruding blade edges is set so as to be greater than or equal to the distance in the radial direction of a continuous blade, and the distance in the radial direction of indented blade edges is set so as to be smaller than the distance in the radial direction of the continuous blade. Accordingly, the cutting resistance of the bore cutter can be reduced.

8 Claims, 2 Drawing Sheets

U.S. PATENT DOCUMENTS

| | | | |
|---|---|---|---|
| 5,636,948 A * | 6/1997 | Rexius .................. 408/224 |
| 6,164,876 A * | 12/2000 | Cordovano ............... 407/59 |
| 6,978,697 B2 * | 12/2005 | Kozak .................... 81/53.2 |
| 7,214,009 B2 * | 5/2007 | Quanz .................... 408/222 |
| 7,241,088 B2 * | 7/2007 | Malagnino et al. .......... 408/222 |
| 2004/0179912 A1 * | 9/2004 | Quanz .................... 408/222 |
| 2007/0280792 A1 * | 12/2007 | Kochan et al. ............. 407/53 |

FOREIGN PATENT DOCUMENTS

| | | |
|---|---|---|
| DE | 19521447 | 12/1996 |
| DE | 102004040580 A1 | 3/2006 |
| JP | 7011879 | 1/1995 |
| TW | 00324044 | 1/1998 |
| TW | 00464569 | 11/2001 |
| TW | M247322 | 10/2004 |
| TW | M270862 | 7/2005 |

* cited by examiner

Fig. 2
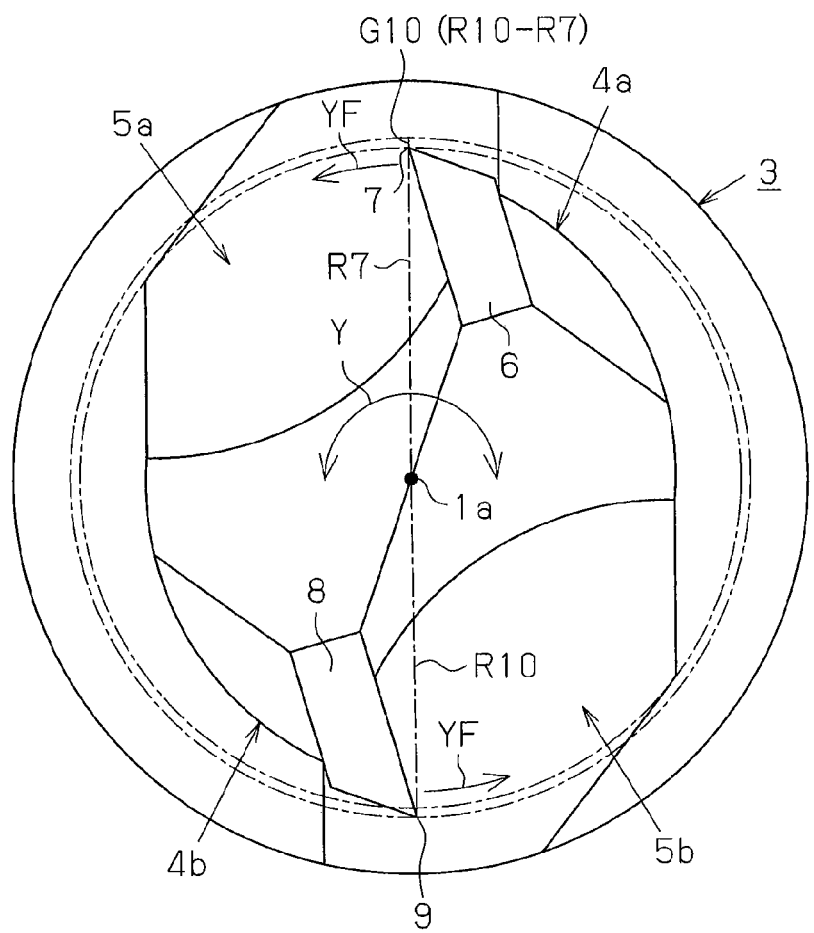
Fig. 3A     Fig. 3B
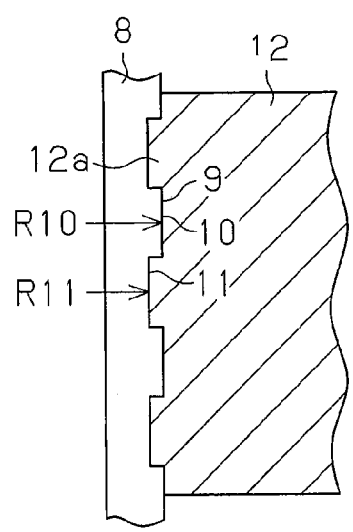 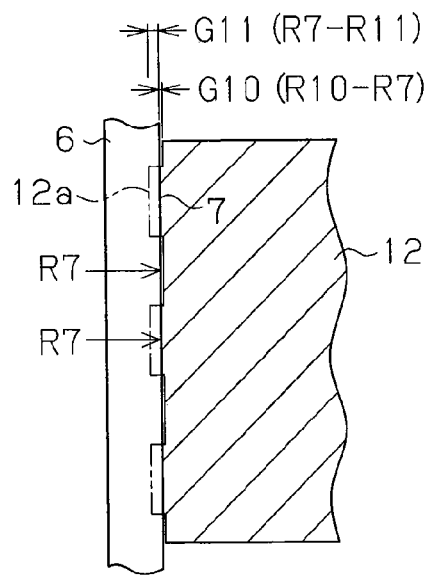

BORE CUTTER

BACKGROUND OF THE INVENTION

The present invention relates to a bore cutter.

Conventional bore cutters of the type described below are known. That is, a number of bore blade portions are provided on the outer periphery of a rotary shaft at equal angular intervals in the circumference with the rotation axis as the center. All of these blade portions have a discontinuous blade having a blade edge in uneven form. These continuous blades have a number of protruding blade edges and indented blade edges which are alternately provided along the rotation axis. The distance of these protruding blade edges from the rotation axis (distance in the radial direction) is set so as to be the same. The distance of these indented blade edges from the rotation axis is also set so as to be the same. The size of these protruding blade edges in the longitudinal direction is set so as to be equal to the size of the indented blades in the longitudinal direction. Furthermore, the depth of all the indented blades is set so as to be equal.

In each pair of circumferentially adjacent blade portion, the protruding edge and the indented edge of the discontinuous blade in one of the blade portions and those of the other blade portion are displaced from each other along the above described rotation axis. When the bore cutter is used, first, a workpiece, or an object in which a hole is to be bored, is cut by the discontinuous blade in one of a circumferentially adjacent pair of blade portions in such a manner that the internal peripheral surface of the object becomes of an uneven form. Next, the workpiece is cut by the discontinuous blade in the other blade portion, and thereby, the protruding portions are cut off.

In such conventional bore cutters, however, discontinuous blades, of which the number of steps for processing is great, are provided in all of the bore blade portions. Accordingly, processing of bore cutters becomes troublesome, and the manufacturing cost increases.

SUMMARY OF THE INVENTION

An objective of the present invention is to provide a bore cutter of which processing can be simplified.

In order to achieve the above described object, the present invention provides a bore cutter with a rotary shaft having a rotation axis. First and second bore blade portions are provided on the outer periphery of the rotary shaft at equal intervals around the circumference with the rotation axis as the center. The above described first bore blade portion has a continuous blade that is formed in such a manner that a continuous first blade edge extends along the above described rotation axis. The above described second bore blade portion has a discontinuous blade that is formed in such a manner that a second blade edge in uneven form extends along the above described rotation axis.

Other characteristics and advantages of the present invention are clarified in the following detailed description and the accompanying drawings which illustrate the characteristics of the present invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is a bottom view showing the cutter of FIG. 1A; and

FIGS. 3A and 3B are views for illustrating the operation of the cutter of FIG. 1A.

DETAILED DESCRIPTION OF THE PREFERRED EMBODIMENTS

Figure 1:
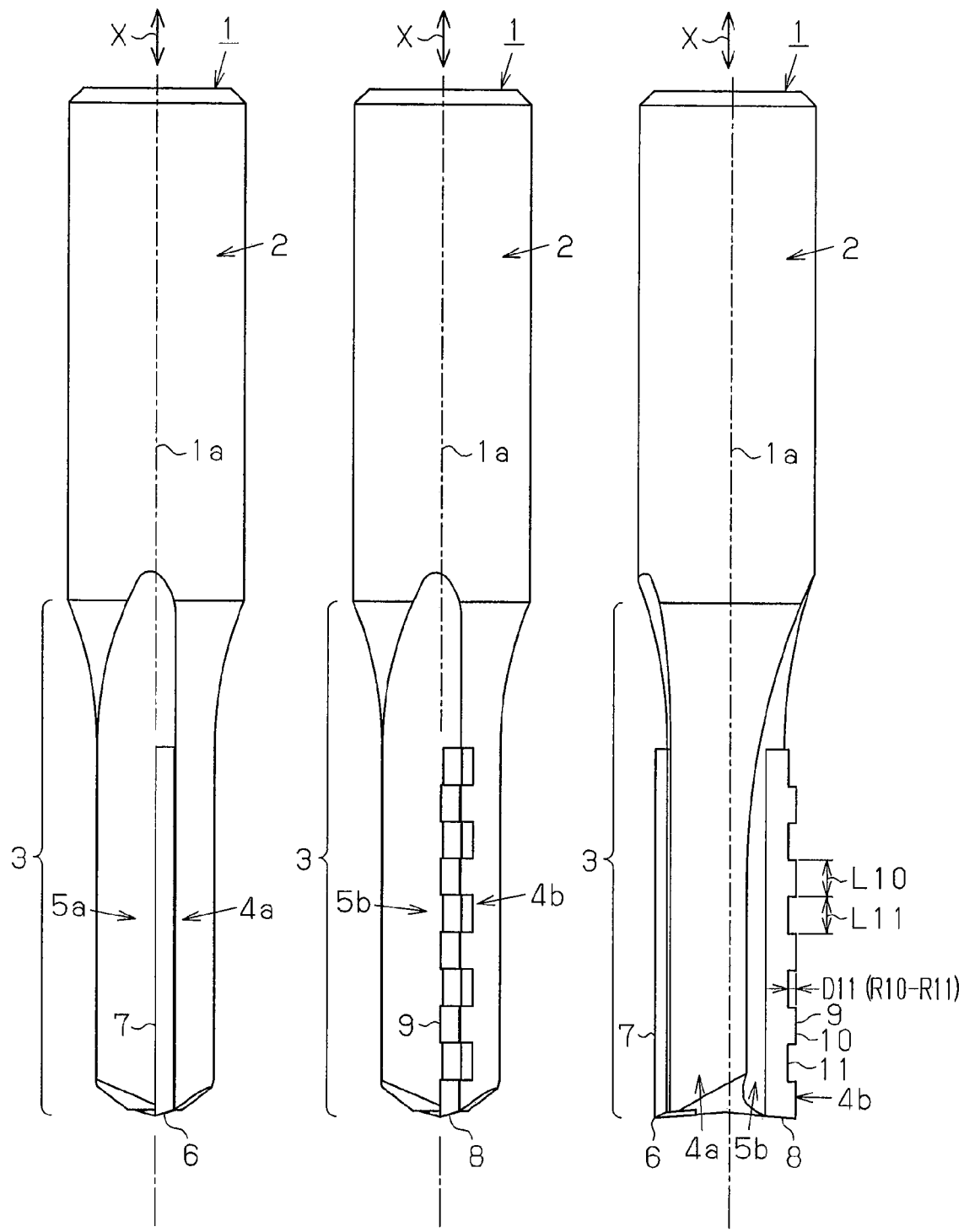
FIG. 1A is a front view showing a bore cutter according to one embodiment of the present invention.
FIG. 1B is a rear view showing the cutter of FIG. 1A.
FIG. 1C is a side view showing the cutter of FIG. 1A.

In the following, a bore cutter according to one embodiment of the present invention is described in reference to the drawings.

As shown in FIGS. 1A to 1C and 2, a rotary shaft 1 has a shank 2 and a blade shaft 3 which extends from this shank 2. A first bore blade portion 4a and a second bore blade portion 4b, which are a number of (two) bore blade portions, are provided on the outer periphery of the blade shaft 3 with groove portions 5a and 5b in between along the circumference with rotation axis 1a as the center. These groove portions 5a and 5b are provided so as to extend along first and second bore blade portions 4a and 4b from the distal end to the distal end of blade shaft 3 in longitudinal direction X along rotation axis 1a.

In the above described first blade portion 4a, one continuous blade 6 is attached to the edge facing the groove portion 5a on the YF side in the rotational direction between the two groove portions 5a and 5b which sandwich the above described first blade portion 4a. This continuous blade 6 has a first blade edge 7 which is provided so as to continuously extend from the distal end to the proximal end of blade shaft 3 in longitudinal direction X along rotation axis 1a.

In the above described second blade portion 4b, one discontinuous blade 8 is attached to the edge facing the groove portion 5b on the YF side in the rotational direction between the two groove portions 5a and 5b which sandwich the above described second blade portion 4b. This discontinuous blade 8 has a second blade edge 9 in uneven form which is provided so as to extend from the distal end to the proximal end of blade shaft 3 in the above described longitudinal direction X.

This second blade edge 9 has a number of protruding blade edges 10 and indented blade edges 11 which are alternately placed in the above described longitudinal direction X. The first blade edge 7 and the second blade edge 9 are placed at equal angular intervals in the circumference (intervals of 180 degrees).

As shown in FIGS. 3A and 3B, distance R10 between the rotation axis 1a and the protruding blade edges 10 (distance in the radial direction, which is, for example, 6 mm) is set so as to be greater than distance R7 between rotation axis 1a and the first blade edges 7 (the continuous blade 6) (distance in the radial direction, which is, for example, 5.85 mm) by dimensional difference G10 (R10−R7, for example, 0.15 mm). In addition, distance R11 between the rotation axis 1a and the indented blade edges 11 (distance in the radial direction, which is, for example, 5.5 mm) is set so as to be smaller than distance R7 between the rotation axis 1a and the continuous blade 6 (for example, 5.85 mm) by dimensional difference G11 (R7−R11, for example, 0.35 mm). The size L10 of each protruding blade edge 10 in the longitudinal direction and the size L11 of each indented blade edge 11 in the longitudinal direction are set so as to be equal to each other (for example, 2.5 mm). The depth D11 of the indented blade edges 11 is set to be equal (R10−R11, for example, 0.5 mm).

A bore cutter is used at a rotational speed of 20000 rpm to 30000 rpm and at a cutting speed of 3 m/min to 12 m/min, and works in the following manner. As shown in FIG. 3A, first, a workpiece 12 in which a hole is to be bored is cut by at least the protruding blade edges 10 from among the protruding blade edges 10 and the indented blade edges 11 in the second blade edge 9 in such a manner that the internal peripheral surface of the workpiece 12 becomes of an uneven form. That is to say, a number of protrusions 12a are formed in the workpiece 12.

Next, the workpiece 12 is cut by the first blade edges 7 of the continuous blade 6, as shown in FIG. 3B. As a result, the major portion of the protrusion 12a of the workpiece 12 is cut off, leaving portions which correspond to the above described dimensional difference G10. Here, distance R10 in the radial direction of the protruding blade edges 10 may be set so as to be the same as distance R7 in the radial direction of the continuous blade 6, that is to say, dimensional difference G10 may be eliminated (set to zero), and in this case, the protrusions 12a are completely cut off.

The bore cutter according to the present embodiment has the following advantages.

(1) The first blade portion 4a has the continuous blade 6 and the second blade portion 4b has the discontinuous blade 8. Distance R10 in the radial direction of the protruding blade edges 10 is set so as to be greater than or equal to distance R7 in the radial direction of the continuous blade 6, and distance R11 in the radial direction of the indented blade edges 11 is set so as to be smaller than distance R7 in the radial direction of the continuous blade 6.

Accordingly, the protrusions 12a of the workpiece 12 that have been formed first by the discontinuous blade 8 are cut off by the continuous blade 6. The workpiece 12 is cut in two stages as described above, and thereby, the cutting resistance of the bore cutter can be reduced. Furthermore, the number of the discontinuous blades 8 of which the number of steps for processing is great can be reduced, so that the processing for the bore cutter can be simplified.

(2) The continuous blade 6 and the discontinuous blade 8 are alternately placed in the circumferential direction Y. Furthermore, the number of the continuous blade 6 formed on the outer periphery of the rotary shaft 1 is one, and the number of discontinuous blade 8 is also one. Furthermore, the continuous blade 6 and the discontinuous blade 8 are placed at equal angular intervals in the circumference. Accordingly, the cutting resistance of the bore cutter can be reduced while further simplifying processing for the bore cutter, so that the advantage of can be gained more easily.

The above described embodiment may be modified in the following manner.

In the above described embodiment, only one first blade portion 4a having the continuous blade 6 and one second blade portion 4b having the discontinuous blade 8 are provided. In the case where the outer diameter of the blade shaft 3 of the rotary shaft 1 is large, however, an even number, for example, four or six, of bore blade portions 4a and 4b may be provided with groove portions 5a and 5b in between in the circumferential direction Y with rotation axis 1a as the center. Continuous blades 6 may be provided to half of the first blade portions 4a from among the even number of the bore blade portions 4a and 4b, and discontinuous blades 8 may be provided to the remaining half of the second blade portions 4b in such a manner that these the continuous blades 6 and the discontinuous blades 8 are placed at equal angular intervals in the circumference in the circumferential direction Y. Here, the continuous blades 6 may be provided to any number of the first blade portions 4a from among an even number of the bore blade portions 4a and 4b, and the discontinuous blades 8 are provided to the remaining second blade portions 4 in such a manner that these continuous blades 6 and discontinuous blades 8 placed at equal angular intervals in the circumferential direction Y.

In addition, it is also possible to provide an odd number, for example, 3 or 5, of bore blade portions 4a and 4b with groove portions 5a and 5b in between in the circumferential direction Y with rotation axis 1a as the center. Continuous blades 6 may be provided to any number of first blade portions 4a from among the odd number of bore blade portions 4a and 4b, and discontinuous blades 8 may be provided to the remaining second blade portions 4b in such a manner that these continuous blades 6 and discontinuous blades 8 are placed at equal angular intervals in the circumferential direction Y. In either case, the number of discontinuous blades 8 of which the number of steps in the processing is great can be reduced in comparison with the prior art, where continuous blades are provided to all of the bore blade portions.

In addition, in the above described embodiment, a so-called straight blade where the first blade edge 7 of the continuous blade 6 and the second blade edges 9 of this discontinuous blade 8 are provided in a line in longitudinal direction X along the rotation axis 1a is described. However, the invention is not limited to this, and it may be modified to a so-called twisted blade where these blade edges 7 and 9 extend spirally in longitudinal direction X along rotation axis 1a.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

The invention claimed is:

1. A bore cutter, comprising:
a rotary shaft having a rotation axis, wherein first and second bore blade portions are provided on an outer periphery of the rotary shaft at intervals in a circumferential direction with said rotation axis at the center,
wherein the first bore blade portion has a continuous blade which is formed by providing a continuous first blade edge in such a manner that the first blade edge extends along said rotation axis, and
wherein the second bore blade portion has a discontinuous blade which is formed by providing a second blade edge in an uneven form in such a manner that the second blade edge extends along said rotation axis, wherein said discontinuous blade is formed to be a rectangular wave form.

2. The cutter according to claim 1,
wherein said second blade edge includes a protruding blade edge and an indented blade edge which are alternately provided in the longitudinal direction of the second blade edge,
wherein said protruding blade edge is formed in such a manner that a distance between said rotation axis and said protruding blade edge is greater than or equal to the distance between said rotation axis and said first blade edge, and
wherein said indented blade edge is formed in such a manner that a distance between said rotation axis and said indented blade edge is smaller than the distance between said rotation axis and said first blade edge.

3. The cutter according to claim 2,
wherein said continuous blade and said discontinuous blade are alternately placed in the circumferential direction.

4. The cutter according to claim 3,
wherein the number of said continuous blade and the number of said discontinuous blade are both one.

5. The bore cutter according to claim 3,
wherein said continuous blade and said discontinuous blade are placed at equal angular intervals in the circumference.

6. The bore cutter according to claim 2,
wherein said distance between said rotation axis and said protruding blade edge is greater than the distance between said rotation axis and said first blade edge by 0.15 mm, and
wherein said distance between said rotation axis and said indented blade edge is smaller than the distance between said rotation axis and said first blade edge by 0.35 mm.

7. The bore cutter according to claim 1,
wherein said second blade edge is provided along said rotation axis.

8. The bore cutter according to claim 1,
wherein said second blade edge extends spirally along said rotation axis.

* * * * *